United States Patent
Gonze et al.

(10) Patent No.: US 8,756,917 B2
(45) Date of Patent: Jun. 24, 2014

(54) CONTROL APPARATUS FOR TEMPERATURE EXCURSIONS WITHIN AN EXHAUST GAS TREATMENT SYSTEM

(75) Inventors: Eugene V. Gonze, Pinckney, MI (US); Michael J. Paratore, Jr., Howell, MI (US); Garima Bhatia, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 180 days.

(21) Appl. No.: 13/219,972

(22) Filed: Aug. 29, 2011

(65) Prior Publication Data

US 2013/0047582 A1 Feb. 28, 2013

(51) Int. Cl.
*F01N 3/00* (2006.01)
*F01N 3/02* (2006.01)
*F01N 3/023* (2006.01)
*F01N 3/32* (2006.01)
*F01N 3/021* (2006.01)

(52) U.S. Cl.
CPC . *F01N 3/02* (2013.01); *F01N 3/021* (2013.01); *F01N 3/023* (2013.01); *F01N 3/323* (2013.01)
USPC ............... 60/286; 60/295; 60/297; 60/298; 60/300; 60/311

(58) Field of Classification Search
CPC .......... F01N 13/082; F01N 3/225; F01N 3/02
USPC ........... 60/274, 286, 289, 290, 297, 300, 303, 60/311, 293, 295
See application file for complete search history.

(56) References Cited

U.S. PATENT DOCUMENTS

| | | | |
|---|---|---|---|
| 7,243,488 B2 * | 7/2007 | Bonadies et al. | 60/295 |
| 7,503,168 B2 * | 3/2009 | Clerc et al. | 60/295 |
| 7,640,729 B2 * | 1/2010 | Durnholz et al. | 60/289 |
| 7,684,924 B2 | 3/2010 | Darr et al. | |
| 2006/0021332 A1 * | 2/2006 | Gaiser | 60/286 |
| 2006/0168947 A1 | 8/2006 | Durnholz et al. | |
| 2009/0012694 A1 * | 1/2009 | Darr et al. | 701/102 |
| 2010/0186386 A1 * | 7/2010 | Tsujimoto et al. | 60/286 |

FOREIGN PATENT DOCUMENTS

CN 101349180 A 1/2009

OTHER PUBLICATIONS

Chinese Office Action for Application No. 201210311821.8 dated Apr. 1, 2014; 7 pages.

* cited by examiner

*Primary Examiner* — Thomas Denion
*Assistant Examiner* — Philip Eklem
(74) *Attorney, Agent, or Firm* — Cantor Colburn LLP

(57) ABSTRACT

An exhaust gas treatment system for an internal combustion engine comprises a particulate filter assembly configured to receive exhaust gas from the engine. The particulate filter assembly comprises an electrically heated catalyst, a particulate filter disposed downstream of the electrically heated catalyst, a hydrocarbon injector, in fluid communication with the exhaust gas, upstream of the electrically heated catalyst and configured to inject excess hydrocarbon into the exhaust gas, an air pump in fluid communication with the exhaust gas upstream of the electrically heated catalyst and configured to deliver air to the exhaust gas to increase the volumetric gas flow rate through, and to decrease the heat residence time in, the particulate filter and a controller configured to operate the hydrocarbon injector, the electrically heated catalyst and the air pump based on predetermined exhaust gas flow rates, temperature thresholds and particulate loadings within the particulate filter.

18 Claims, 2 Drawing Sheets

CONTROL APPARATUS FOR TEMPERATURE EXCURSIONS WITHIN AN EXHAUST GAS TREATMENT SYSTEM

FIELD OF THE INVENTION

Exemplary embodiments of the invention relate to exhaust gas treatment systems for internal combustion engines and, more particularly, to a method of reducing temperature excursions during the regeneration of an exhaust gas particulate filter.

BACKGROUND

The exhaust gas emitted from an internal combustion engine is a heterogeneous mixture that may contain gaseous emissions such as carbon monoxide ("CO"), unburned hydrocarbons ("HC") and oxides of nitrogen ("$NO_x$") as well as condensed phase materials (liquids and solids) that constitute particulate matter ("PM"). Catalyst compositions typically disposed on catalyst supports or substrates are provided in an engine exhaust system to convert certain, or all of these exhaust constituents into non-regulated exhaust gas components.

In the realm of exhaust treatment technologies, there are several known filter structures that have displayed effectiveness in removing particulate matter from the exhaust gas such as ceramic honeycomb wall flow filters, wound or packed fiber filters, open cell foams, sintered metal fibers, etc. Ceramic wall flow filters have experienced significant acceptance in automotive applications.

Typically, a particulate filter is disposed within an exhaust treatment system to filter particulates from the exhaust gas. Over time, the particulate filter may become full and cleaning or "regeneration" is required to remove the trapped particulates. Regeneration of a particulate filter in vehicle applications is typically automatic and is controlled by an engine or other controller based on signals generated by engine and exhaust system sensors. The regeneration event involves increasing the temperature of the particulate filter to levels that are often in the range of 600° C. in order to burn the accumulated particulates and to thereby enable the continuation of the filtering process.

There are certain control issues associated with exhaust gas filter regeneration. A drop-to-idle condition, which occurs when an internal combustion engine operating at moderate to high speed suddenly slows to a low or idle speed, may occur during regeneration. This condition may result is a sudden reduction of the exhaust gas flow rate through the regenerating filter. Upon a sudden reduction in exhaust flow through the regenerating filter, the heat generated by the oxidation of the accumulated particulates accumulates in the particulate filter (i.e. the exhaust gas flow rate is insufficient to remove the heat from the oxidizing particulates) and may lead to a temperature excursion that can be damaging to the filter substrate.

Accordingly, it is desirable to provide an apparatus and method for controlling temperature excursions that may occur during drop-to-idle engine operation during a particulate filter regeneration event.

SUMMARY OF THE INVENTION

In an exemplary embodiment of the invention, an exhaust gas treatment system for an internal combustion engine comprises an exhaust gas conduit in fluid communication with, and configured to receive exhaust gas from, the internal combustion engine and a particulate filter assembly in fluid communication with the exhaust gas conduit and configured to receive exhaust gas flowing therethrough. The particulate filter assembly comprises an electrically heated catalyst, a particulate filter disposed downstream of the electrically heated catalyst to remove particulate material from the exhaust gas, a hydrocarbon injector in fluid communication with the exhaust gas conduit upstream of the electrically heated catalyst and configured to inject excess hydrocarbon into the exhaust gas flowing therethrough, an air pump in fluid communication with the exhaust gas conduit upstream of the electrically heated catalyst and configured to deliver air to the exhaust gas conduit to increase the volumetric gas flow rate through, and to decrease the heat residence time in, the particulate filter and a controller configured to operate the hydrocarbon injector, the electrically heated catalyst and the air pump based on predetermined exhaust gas flow rates, temperature thresholds and particulate loadings within the particulate filter.

In another exemplary embodiment of the invention a method for regenerating a particulate filter assembly in an exhaust system of an internal combustion engine having an exhaust gas conduit in fluid communication with, and configured to receive exhaust gas from, the internal combustion engine, the particulate filter assembly in fluid communication with the exhaust gas conduit and configured to receive exhaust gas flowing therethrough, the particulate filter assembly comprising an electrically heated catalyst, a catalytic converter downstream of the electrically heated catalyst, a particulate filter disposed downstream of the catalytic converter to remove particulate material from the exhaust gas, a hydrocarbon injector in fluid communication with the exhaust gas conduit upstream of the electrically heated catalyst and configured to inject excess hydrocarbon into the exhaust gas flowing therethrough, an air pump in fluid communication with the exhaust gas conduit upstream of the electrically heated catalyst and configured to deliver air to the exhaust gas conduit to increase the volumetric gas flow rate and decrease the heat residence time through the particulate filter and a controller configured to operate the hydrocarbon injector, the electrically heated catalyst and the air pump based on predetermined exhaust gas flow rates, temperature thresholds and particulate loadings within the particulate filter comprises heating the electrically heated catalyst to a hydrocarbon oxidation temperature, activating the hydrocarbon injector to deliver excess hydrocarbon into the exhaust gas, oxidizing the excess hydrocarbon in the electrically heated catalyst to raise the temperature of the exhaust gas and to oxidize particulates in the particulate filter, monitoring the exhaust gas flow rate, monitoring the temperature of the particulate filter, and deactivating the electrically heated catalyst and the hydrocarbon injector and activating the air pump when the exhaust flow rate through the particulate filter drops below a predetermined flow rate threshold or the temperature of the particulate filter is above a predetermined temperature threshold, or both.

The above features and advantages, and other features and advantages of the invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of the embodiments, the detailed description referring to the drawing in which.

DESCRIPTION OF THE EMBODIMENTS

Figure 1:
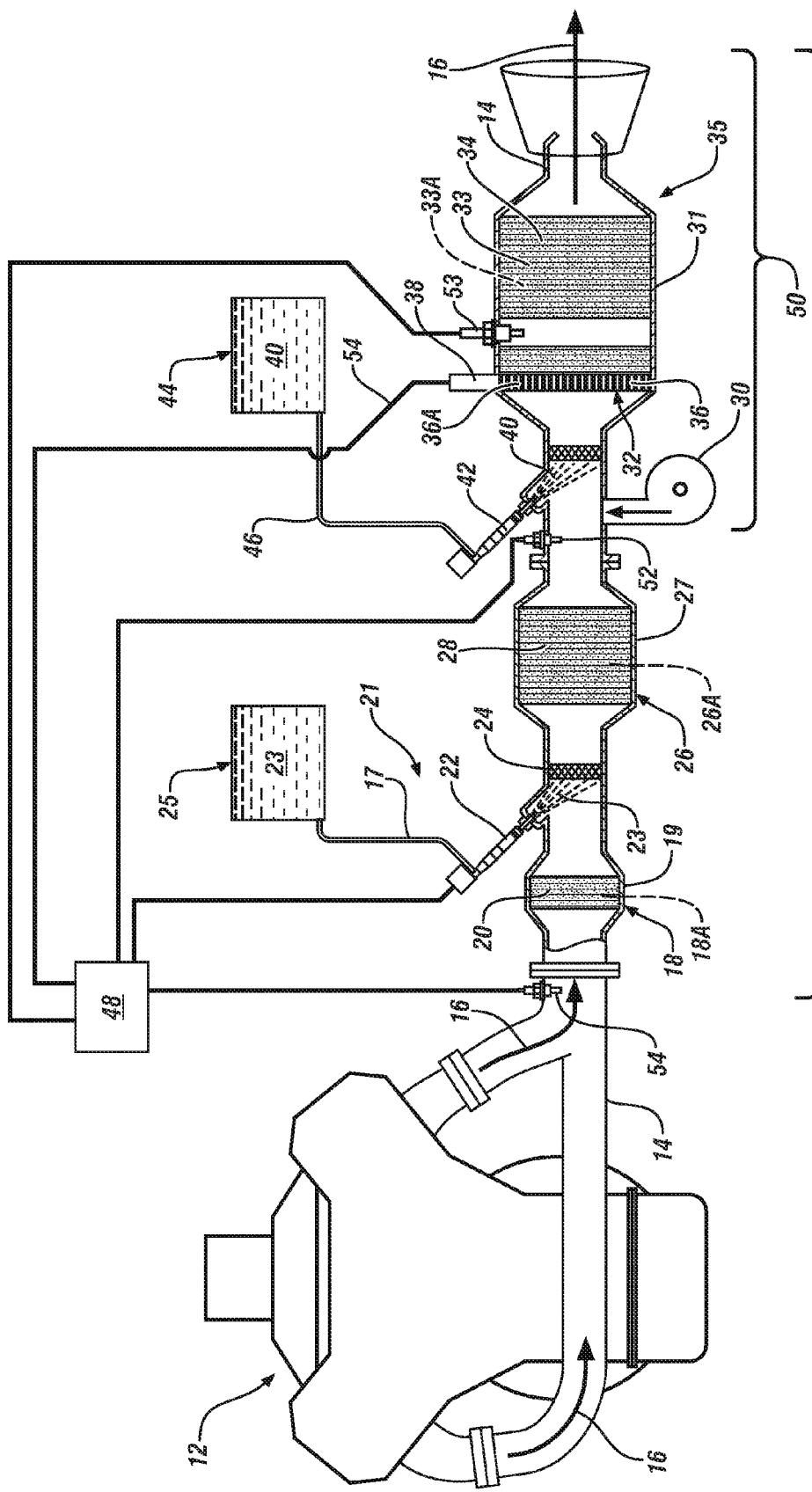
FIG. 1 is a schematic view of an exhaust gas treatment system for an internal combustion engine embodying aspects of the invention.

The following description is merely exemplary in nature and is not intended to limit the present disclosure, its application or uses. It should be understood that throughout the drawings, corresponding reference numerals indicate like or corresponding parts and features.

Referring now to FIG. 1, an exemplary embodiment of the invention is directed to an exhaust gas treatment system, referred to as 10, for the reduction of regulated exhaust gas constituents of an internal combustion engine 12. It can be appreciated that the invention described herein can be implemented in various engine systems implementing an exhaust gas particulate filter. Such engine systems may include, but are not limited to, diesel engines, gasoline direct injection systems and homogeneous charge compression ignition engine systems.

The exhaust gas treatment system 10 includes an exhaust gas conduit 14, which may comprise several segments, that is in fluid communication with and is configured to receive exhaust gas 16 from the internal combustion engine 12 and to transport the exhaust gas 16 from the engine 12 to various exhaust treatment devices of the exhaust gas treatment system 10.

According to an exemplary embodiment of the invention, one exhaust treatment device may include an oxidation catalyst device ("OC") 18 having an oxidation catalyst compound 18A disposed thereon that is configured to induce oxidation of certain exhaust gas constituents such as carbon monoxide ("CO") and excess hydrocarbons ("HC") resulting in an exothermic reaction that may raise the temperature of the exhaust gas 16. The oxidation catalyst device 18 may include a flow-through metal or ceramic monolith substrate 20 that is wrapped in an insulating and securing material which is then packaged in a rigid shell or canister 19. The canister 19 includes an inlet and an outlet in fluid communication with exhaust gas conduit 14. The oxidation catalyst compound 18A may be applied as a wash coat and may contain platinum group metals such as platinum (Pt), palladium (Pd), rhodium (Rh) or other suitable oxidizing catalysts, or combination thereof.

In an exemplary embodiment, a selective catalytic reduction device ("SCR") 26 may be disposed downstream of the oxidation catalyst device 18. In a manner similar to the oxidation catalyst device 18, the SCR 26 may also include a flow-through ceramic or metal monolith substrate 28 that is wrapped in an insulating and securing material (not shown) which is then packaged in a rigid shell or canister 27. The canister 27 includes an inlet and an outlet in fluid communication with exhaust gas conduit 14. The substrate 28 has an SCR catalyst composition 26A applied thereto. The SCR catalyst composition 26A preferably contains a zeolite and one or more base metal components such as iron ("Fe"), cobalt ("Co"), copper ("Cu") or vanadium ("V") which can operate efficiently to convert oxides of nitrogen ("$NO_x$") constituents in the exhaust gas 16 in the presence of an ammonia based reductant. That is, the SCR 26 selectively adsorbs an ammonia based reductant and reduces $NO_x$ passing through the SCR 26.

An ammonia based reductant 23 is introduced into the exhaust treatment system 10 via a reductant supply system 21 that is connected to, and is in fluid communication with, the exhaust gas conduit 14. In an exemplary embodiment, the reluctant supply system 21 includes a reductant injector 22 disposed upstream of the selective catalytic reduction device ("SCR") 26 in fluid communication with the exhaust gas conduit 14. The reductant injector 22 is configured to periodically and selectively inject the ammonia based reductant 23 into the exhaust gas 16 between the oxidation catalyst device ("OC") 18 and the selective catalytic reduction device ("SCR") 26. Other suitable methods of delivery of the ammonia based reductant 23 to the exhaust gas 16 may be used. The ammonia based reductant 23 is supplied from a reductant supply tank 25 through conduit 17. The reductant 23 may be in the form of a gas, a liquid or an aqueous urea solution and may be mixed with air in the reductant injector 22 to aid in the dispersion of the injected reductant spray in the exhaust gas 16. A mixer or turbulator 24 may disposed within the exhaust conduit 14 in close proximity to the injector 22 to further assist in thorough mixing of the reductant 23 with the exhaust gas 16.

In an exemplary embodiment, the exhaust gas treatment system 10 further comprises a particulate filter system 50 that includes a particulate filter assembly 35 (to be described in further detail below) and an air pump 30. The air pump 30 is in fluid communication with the exhaust gas conduit 14, and is configured to deliver air to the exhaust gas treatment system 10. As further shown in FIG. 1, according to an embodiment of the invention, the particulate filter assembly 35 is in fluid communication with the exhaust gas conduit 14 and is configured to receive the exhaust gas 16. The particulate filter assembly 35 includes an electrically heated catalyst (EHC) 32 located upstream of a particulate filter 33. In an exemplary embodiment, the electrically heated catalyst (EHC) 32 and the particulate filter 33 are packaged together in a rigid shell or canister 31. The canister 31 includes an inlet and an outlet in fluid communication with exhaust gas conduit 14.

The particulate filter 33 may be constructed using a ceramic wall flow monolith exhaust gas filter substrate 34 in which exhaust gas 16 entering the particulate filter 33 is forced to migrate through porous, adjacently extending walls. It is through this mechanism that the exhaust gas 16 is filtered of carbon and other particulates. The filtered particulates are deposited within the particulate filter 33 and, over time, will have the effect of increasing the exhaust gas backpressure experienced by the internal combustion engine 12. It is appreciated that the ceramic wall flow monolith exhaust gas filter substrate 34 is merely exemplary in nature and that the particulate filter 33 may include other filter devices such as wound or packed fiber filters, open cell foams, sintered metal fibers, etc. In an exemplary embodiment, the described increase in exhaust gas backpressure caused by the accumulation of particulate matter requires that the exhaust gas filter substrate 34 of the particulate filter 33 be periodically cleaned, or regenerated. Regeneration involves the oxidation or burning of the accumulated carbon and other particulates in what is typically a high temperature (about 350° C. to about 600° C.) environment.

The electrically heated catalyst (EHC) 32 may comprise a metal substrate 36 to which an oxidation catalyst component or components 36A are applied. Electric voltage is delivered through an electrode 38 of the EHC 32, to initiate an EHC heating mode, and electric current flows through the metal substrate 36 resulting in rapid heating thereof. The temperature of the metal substrate 36, and the applied oxidation catalyst component or components 36A, are raised to a temperature at which the catalytic component can initiate the oxidation of carbon monoxide (CO) and hydrocarbons (HC)

in the exhaust gas 16 (i.e. hydrocarbon oxidation temperature). The temperature of the exhaust gas 16 flowing through the electrically heated catalyst (EHC) 32 is raised as a result of the heat generated from the oxidation reaction as well as the current flowing through the metal substrate 36. Subsequently, the heated exhaust gas 16 exits the electrically heated catalyst (EHC) 32 and flows into the particulate filter 33. An oxidation catalyst compound 33A may also be applied as a wash coat to the particulate filter 33 and may contain platinum group metals such as platinum (Pt), palladium (Pd), rhodium (Rh) or other suitable oxidizing catalysts, or combination thereof.

Normally the particulate filter 33 is regenerated by raising the exhaust gas temperature to a particulate oxidation temperature (about 350° C. to about 600° C.) that is sufficient to promote the oxidization of the particulate matter entrained therein. Initiation of a regeneration event is typically through the injection of excess hydrocarbon 40 (e.g., fuel) via a hydrocarbon injector 42 disposed upstream of the electrically heated catalyst (EHC) 32 once it has been raised to a temperature at which the catalytic component can initiate the oxidation of carbon monoxide (CO) and hydrocarbons (HC) in the exhaust gas 16 by the application of an electric voltage as described above. The hydrocarbon injector 42, in fluid communication with HC supply 40 in fuel supply tank 44 through conduit 46, is configured to introduce the excess hydrocarbon 40 into the exhaust gas stream 16 upstream of the electrically heated catalyst (EHC) 32. A controller such as vehicle controller 48 is operably connected to, and monitors, the exhaust gas treatment system 10 through signal communication with a number of sensors. As used herein the term controller may include an application specific integrated circuit (ASIC), an electronic circuit, a processor (shared, dedicated or group) and memory that executes one or more software or firmware programs, a combinational logic circuit, and/or other suitable components that provide the described functionality.

In an exemplary embodiment, a backpressure sensor 52, located upstream of the particulate filter 33 generates a signal indicative of the carbon and particulate loading in the ceramic wall flow monolith exhaust gas filter substrate 34. Upon a determination that the backpressure has reached a predetermined level indicative of the need to clean or regenerate the particulate filter 33 the controller 48 activates the electrically heated catalyst (EHC) 32 to initiate an EHC heating mode and upon reaching a selected oxidation temperature initiates the hydrocarbon injector 42 to supply excess hydrocarbon 40 to the exhaust gas 16, as described. One or more temperature sensors 53 and exhaust flow sensors 54 may be in signal communication with the controller 48 and allow the controller to adjust the temperature of the electrically heated catalyst (EHC) 32, and the volume of injected hydrocarbon 40, to thereby control the temperature of the ceramic wall flow monolith exhaust gas filter substrate 34 of the particulate filter assembly 35, and to manage the heat residence time therein to prevent temperature excursions above a predetermined temperature threshold (ex. >550° C.) which could damage the substrate or the catalyst compounds disposed thereon.

In an exemplary embodiment, during a regeneration of the ceramic wall flow monolith exhaust gas filter substrate 34 of the particulate filter assembly 35, if the internal combustion engine 12 attains a predetermined flow rate threshold such as an operating speed that approaches or is at idle (drop-to-idle condition) the controller 48 will deactivate the hydrocarbon injector 42 and the electrically heated catalyst (EHC) 32 and will activate the air pump 30 to supply air to the exhaust gas treatment system 10 to thereby maintain sufficient volumetric gas flow through the particulate filter assembly 35 to reduce the heat residence time therein and to transfer the supplied heat from the electrically heated catalyst (EHC) 32 and the heat of oxidation from the combusting particulate matter in the ceramic wall flow monolith exhaust gas filter substrate 34 through, and out of, the particulate filter 33; thereby preventing a temperature excursion caused by low exhaust gas flow from the internal combustion engine 12. When the flow rate of the exhaust gas 16 from the internal combustion engine returns to levels sufficient to prevent a temperature excursion within the particulate filter 33 the controller 48 may deactivate the air pump 30 and regeneration of the particulate filter 33 is resumed.

Figure 2:
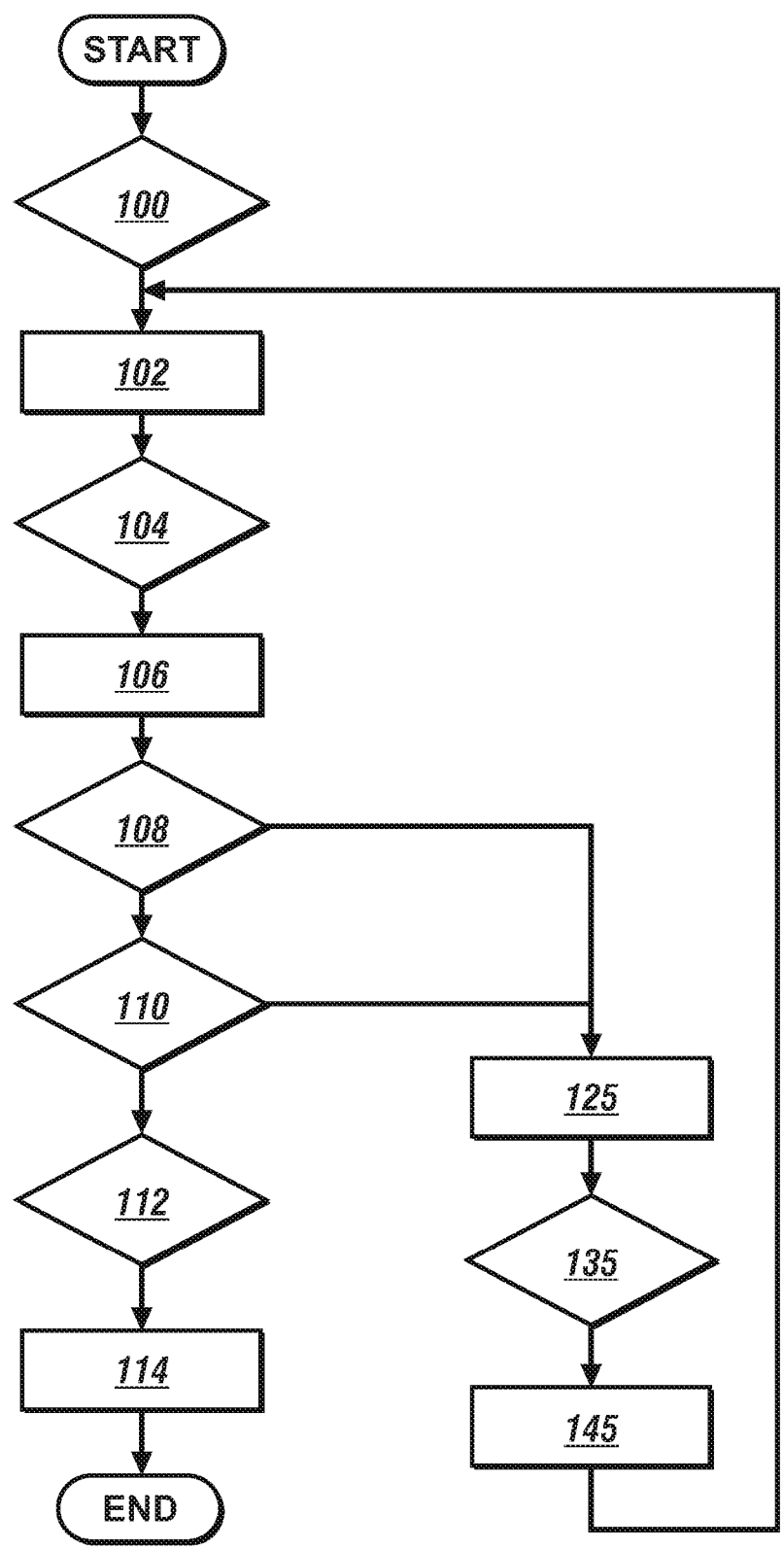
FIG. 2 is flow chart of a control method embodying aspects of the invention.

FIG. 2 is a flow chart illustrating a control method embodying aspects of the invention. As shown in FIG. 2, at operation 100 a regeneration event of the particulate filter 33 is initiated upon a determination that the backpressure has reached a predetermined level indicative of the need to clean or regenerate the ceramic wall flow monolith exhaust gas filter substrate 34 of the particulate filter 33. At operation 102, the controller 48 activates the electrically heated catalyst (EHC) 32 to initiate an EHC heating event and to raise the temperature of the device to a hydrocarbon HC oxidation temperature. Once the hydrocarbon oxidation temperature is reached at operation 104 in the electrically heated catalyst (EHC) 32, at operation 106, the controller activates the hydrocarbon injector 42 and excess hydrocarbon 40 is injected into the exhaust gas 16 for oxidation in the electrically heated catalyst (EHC) 32, and subsequent oxidation of particulate material within the ceramic wall flow monolith exhaust gas filter substrate 34 of the particulate filter 33. From operation 106, the process continues to operation 108, where a temperature of the ceramic wall flow monolith exhaust gas filter substrate 34 of the particulate filter 33 is determined. From operation 108 the process continues to operation 110 where an exhaust gas flow rate at the particulate filter is determined. According to an exemplary embodiment of the invention, when the temperature of the particulate filter is determined to be above a predetermined temperature threshold of approximately 550° C. at operation 108, or the exhaust gas flow rate is determined to be at a predetermined flow rate threshold such as at or near an idle state at operation 110, or both, the process continues to operation 125 where the controller deactivates the hydrocarbon injector and the electrically heated catalyst (EHC) 32 and activates the air pump 30 to input air into the exhaust gas treatment system 10 to increase the volumetric flow of gas and, as a result, the heat transfer through the particulate filter 35.

At operation 135, if the temperature of the particulate filter is not greater than the predetermined temperature threshold and the exhaust gas flow rate is above the predetermined flow rate threshold then, at operation 145, the air pump 30 is deactivated and normal regeneration of the particulate filter is resumed. If, at operation 112, a determination is made that the backpressure has reached a predetermined level indicative of a clean or regenerated ceramic wall flow monolith exhaust gas filter substrate 34 then at operation 114 the controller will deactivate the hydrocarbon injector 42 and the electrically heated catalyst (EHC) 32.

The invention provides the advantages of reducing thermal excursions during the regeneration of an exhaust particulate filter by suppression using cooler exhaust temperatures and higher flows created via use of the air pump.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the present application.

What is claimed is:

1. An exhaust gas treatment system for an internal combustion engine, comprising:
    an exhaust gas conduit in fluid communication with, and configured to receive exhaust gas from, the internal combustion engine;
    a particulate filter assembly in fluid communication with the exhaust gas conduit and configured to receive exhaust gas flowing therethrough, the particulate filter assembly comprising:
    an electrically heated catalyst that is configured to receive a flow of electric current, to be heated by the flow of electric current, and to thereby increase a temperature of the exhaust gas;
    a particulate filter disposed downstream of the electrically heated catalyst to remove particulate material from the exhaust gas;
    a hydrocarbon injector in fluid communication with the exhaust gas conduit upstream of the electrically heated catalyst and configured to inject excess hydrocarbon into the exhaust gas flowing therethrough;
    an air pump in fluid communication with the exhaust gas conduit upstream of the electrically heated catalyst and configured to deliver a flow of air to the exhaust gas conduit to increase the volumetric gas flow rate through, and decrease the heat residence time in, the particulate filter;
    a controller configured to operate the hydrocarbon injector, the electrically heated catalyst and the air pump based on predetermined exhaust gas flow rates, temperature thresholds and particulate loadings within the particulate filter;
    a flow rate sensor in fluid communication with the exhaust gas in the exhaust conduit and in signal communication with the controller to generate a signal indicative of the flow rate in the exhaust conduit; and
    a temperature sensor in fluid communication with the exhaust gas in the particulate filter assembly and in signal communication with the controller to generate a signal indicative of the temperature in the particulate filter assembly;
    wherein the controller is configured to:
        receive the signal indicative of the temperature in the particulate filter assembly and to compare the temperature in the particulate filter assembly to the predetermined temperature threshold;
        receive the signal indicative of the flow rate in the exhaust conduit and to compare the flow rate in the exhaust conduit to the predetermined flow rate threshold;
        when either (i) the temperature in the particulate filter assembly is greater than the predetermined temperature threshold or (ii) the flow rate in the exhaust conduit is less than the predetermined flow rate threshold, then (iii) decrease the flow of electric current to the electrically heated catalyst, (iv) decrease the excess hydrocarbon supplied via the hydrocarbon injector, and (v) activate the air pump; and
        when both (vi) the temperature in the particulate filter assembly is less than the predetermined temperature threshold and (vii) the flow rate in the exhaust conduit is greater than the predetermined flow rate threshold, then (viii) deactivate the air pump.

2. The exhaust gas treatment system of claim 1, wherein the controller is configured to initiate a regeneration of the particulate filter by delivering the flow of electric current to the electrically heated catalyst so as to thereby heat the electrically heated catalyst to a hydrocarbon oxidation temperature and subsequently supplying excess hydrocarbon to the exhaust gas via the hydrocarbon injector.

3. The exhaust gas treatment system of claim 2, wherein the controller is configured to limit regeneration temperatures in the particulate filter by decreasing the flow of electric current to the electrically heated catalyst and decreasing the excess hydrocarbon supplied via the hydrocarbon injector and activating the air pump when the exhaust flow rate through the particulate filter drops below a predetermined flow rate threshold.

4. The exhaust gas treatment system of claim 3, wherein the predetermined flow rate threshold is determined based on a flow rate that corresponds to an engine idle state.

5. The exhaust gas treatment system of claim 2, wherein the controller is configured to limit regeneration temperatures in the particulate filter by decreasing the flow of electric current to the electrically heated catalyst and decreasing the excess hydrocarbon supplied via the hydrocarbon injector and activating the air pump when a temperature of the particulate filter is above a predetermined temperature threshold.

6. The exhaust gas treatment system of claim 5, wherein the predetermined threshold temperature is above approximately 550° C.

7. A method for regenerating a particulate filter assembly in an exhaust system of an internal combustion engine having an exhaust gas conduit in fluid communication with, and configured to receive exhaust gas from, the internal combustion engine, the particulate filter assembly in fluid communication with the exhaust gas conduit and configured to receive exhaust gas flowing therethrough, the particulate filter assembly comprising an electrically heated catalyst that is configured to receive a flow of electric current, to be heated by the flow of electric current, and to thereby increase a temperature of the exhaust gas, a catalytic converter downstream of the electrically heated catalyst, a particulate filter disposed downstream of the catalytic converter to remove particulate material from the exhaust gas, a hydrocarbon injector in fluid communication with the exhaust gas conduit upstream of the electrically heated catalyst and configured to inject excess hydrocarbon into the exhaust gas flowing therethrough, an air pump in fluid communication with the exhaust gas conduit upstream of the electrically heated catalyst and configured to deliver a flow of air to the exhaust gas conduit to increase the volumetric gas flow rate and decrease the heat residence time through the particulate filter and a controller configured to operate the hydrocarbon injector, the electrically heated catalyst and the air pump based on predetermined exhaust gas flow rates, temperature thresholds and particulate loadings within the particulate filter, the method comprising:
    providing a flow of electric current to the electrically heated catalyst so as to heat the electrically heated catalyst to a hydrocarbon oxidation temperature;
    activating the hydrocarbon injector to deliver excess hydrocarbon into the exhaust gas;
    oxidizing the excess hydrocarbon in the electrically heated catalyst to raise the temperature of the exhaust gas and to oxidize particulates in the particulate filter;

monitoring the exhaust gas flow rate;
monitoring the temperature of the particulate filter; and
deactivating the electrically heated catalyst and the hydrocarbon injector and activating the air pump when (i) the exhaust flow rate through the particulate filter is less than a predetermined flow rate threshold or (ii) the temperature of the particulate filter is greater than a predetermined temperature threshold, or both; and
deactivating the air pump when both (iii) the temperature in the particulate filter is less than the predetermined temperature threshold and (iv) the flow rate through the particulate filter is greater than the predetermined flow rate threshold.

8. The method for regenerating a particulate filter assembly of claim 7, wherein the predetermined flow rate threshold is determined based on a flow rate that corresponds to an engine idle state.

9. The method for regenerating a particulate filter assembly of claim 7, wherein the predetermined temperature threshold is above approximately 550° C.

10. The exhaust gas treatment system of claim 1, wherein the particulate filter assembly further comprises a canister, the canister having an inlet in fluid communication with the exhaust gas conduit and an outlet in fluid communication with the exhaust gas conduit, the electrically heated catalyst and the particulate filter being packaged within the canister, the electrically heated catalyst being disposed for receiving exhaust gas from the inlet, the particulate filter being disposed for receiving the exhaust gas from the electrically heated catalyst and for delivering the exhaust gas to the outlet.

11. The exhaust gas treatment system of claim 10, wherein the canister comprises a rigid shell.

12. The exhaust gas treatment system of claim 1, wherein the electrically heated catalyst comprises a metal substrate to which an oxidation catalyst is applied.

13. The exhaust gas treatment system of claim 12, wherein the electrically heated catalyst comprises an electrode coupled to a flow of electric current and disposed for heating the metal substrate when the flow of electric current flows through the electrode.

14. The exhaust gas treatment system of claim 1:
further comprising a backpressure sensor in fluid communication with the exhaust gas upstream of the particulate filter and in signal communication with the controller to generate a signal indicative of the backpressure upstream of the particulate filter:
wherein the controller is configured to receive the signal indicative of the backpressure upstream of the particulate filter and to compare the backpressure upstream of the particulate filter to a predetermined backpressure threshold.

15. The exhaust gas treatment system of claim 14:
wherein the controller is configured to initiate a regeneration of the particulate filter when the backpressure upstream of the particulate exceeds the predetermined backpressure threshold;
wherein the predetermined backpressure threshold corresponds to a need to regenerate the particulate filter;
wherein the controller is configured to initiate a regeneration of the particulate filter by delivering the flow of electric current to the electrically heated catalyst so as to thereby heat the electrically heated catalyst to a hydrocarbon oxidation temperature and subsequently supplying excess hydrocarbon to the exhaust gas via the hydrocarbon injector when a temperature of the electrically heated catalyst exceeds a hydrocarbon oxidation temperature; and
wherein the controller is configured to limit regeneration temperatures in the particulate filter by decreasing the flow of electric current to the electrically heated catalyst and decreasing the excess hydrocarbon supplied via the hydrocarbon injector and activating the air pump when the exhaust flow rate through the particulate filter drops below a predetermined flow rate threshold.

16. The exhaust gas treatment system of claim 15, further comprising a temperature sensor in fluid communication with the exhaust gas in the particulate filter assembly and in signal communication with the controller to generate a signal indicative of a temperature in the particulate filter assembly, wherein the controller is configured to receive the signal indicative of the temperature in the particulate filter assembly and to compare the temperature in the particulate filter assembly to a predetermined temperature threshold,
wherein the controller is configured to limit regeneration temperatures in the particulate filter by monitoring the temperature in the particulate filter assembly, by decreasing the flow of electric current to the electrically heated catalyst, by decreasing the excess hydrocarbon supplied via the hydrocarbon injector, and by activating the air pump when the temperature of the particulate filter assembly exceeds a predetermined temperature threshold.

17. The exhaust gas treatment system of claim 15:
further comprising a flow rate sensor in fluid communication with the exhaust gas in the exhaust conduit and in signal communication with the controller to generate a signal indicative of the flow rate in the exhaust conduit,
wherein the controller is configured to receive the signal indicative of the flow rate in the exhaust conduit and to compare the flow rate in the exhaust conduit to the predetermined flow rate threshold;
wherein the controller is further configured to reduce temperature excursions within the particulate filter by decreasing the flow of electric current to the electrically heated catalyst, by decreasing the excess hydrocarbon supplied via the hydrocarbon injector, and by activating the air pump when the flow rate in the exhaust conduit falls below the predetermined flow rate threshold.

18. The exhaust gas treatment system of claim 17, wherein the predetermined flow rate threshold is determined based on a flow rate that corresponds to an engine idle state.

* * * * *